United States Patent [19]

Cousins et al.

[11] Patent Number: 5,673,404
[45] Date of Patent: Sep. 30, 1997

[54] END-USER CUSTOMIZABLE FEEDBACK DISPLAY FOR WINDOWED APPLICATIONS

[75] Inventors: William R. Cousins, Columbia, S.C.; Karen M. Carl, Aurora, Ill.

[73] Assignee: AT&T Global Information Solutions Company, Dayton, Ohio

[21] Appl. No.: 575,710

[22] Filed: Dec. 20, 1995

[51] Int. Cl.$^6$ .................................................. G06F 3/00
[52] U.S. Cl. ........................... 395/347; 395/975; 395/334
[58] Field of Search .................................. 395/333, 334, 395/336, 338, 347, 339

[56] References Cited

U.S. PATENT DOCUMENTS 5,487,141  1/1996  Cain et al. ......................... 395/155 X
5,542,088  7/1996  Jennings, Jr. et al. ................ 395/650

*Primary Examiner*—Raymond J. Bayerl
*Assistant Examiner*—A. Katbab

*Attorney, Agent, or Firm*—James M. Stover

[57] ABSTRACT

A method for displaying status information during execution of an application task in a windowed application. The method provides two formats for displaying status information for an application task: (1) a detailed display format wherein status information is presented in a dialog box displayed over the application window, obscuring a portion of the application window, and which remains displayed until execution of the application task completes and obscuring a portion of said display screen; and (2) a concise display format wherein a brief summary of the status information is presented in a message displayed in a status bar along the bottom edge of the application window. The detailed display format wherein status information is presented in a dialog box is presented as the default display format. The concise display format is selected by dragging the title bar for the dialog box into the status bar, the concise display format thereafter being displayed in substitution for the detailed display format. Dragging the message displayed in the status bar into the body of the application window returns the display format to the detailed, dialog box, display format.

4 Claims, 9 Drawing Sheets

END-USER CUSTOMIZABLE FEEDBACK DISPLAY FOR WINDOWED APPLICATIONS

The present invention relates to software applications for Windows™ and similar computer operating environments and, more particularly, to a mechanism for controlling how information is displayed by Windows applications.

BACKGROUND OF THE INVENTION

Graphical user interfaces (GUIs), such as those provided by the Apple Macintosh, Windows™ and OS/2™ operating environments, have increased in popularity for use with personal and desktop computer systems in recent years, nearly replacing character-based user interfaces such as MS-DOS®. A graphical user interface is a display format which enables a user to choose commands, execute application programs, manage computer files, and perform other functions by selecting pictorial representations, known as icons, or items from a menu through use of a pointing device such as a mouse.

The Windows operating environment, as well as most other popular GUI environments, presents application, system status, and other information to the user in "windows" appearing on the computer monitor screen. A window is a rectangular area within the display screen in which a user views an application or document. A window may be open, closed, displayed "full screen", reduced to an icon, increased or reduced in size, or moved to different areas of the display. Multiple windows may be displayed simultaneously. These windows can be displayed in several ways, such as: windows included within other windows, windows overlapping other windows, or windows tiled within the display area.

The term "Windows application" refers to a software application program that is designed to operate within a Windows operating environment. All Windows applications are displayed in a similar manner within an application window and follow similar conventions for the arrangement of menus, style of dialog boxes, and use of the keyboard and mouse. The name of an application and any associated document, and a menu bar for the application are typically displayed at the top of the application window which contains the running application.

Within an application window, additional windows or panes may also be displayed. One such window, referred to as a dialog box, is displayed to request information from the user or to supply information to the user. Unfortunately, in many applications a dialog box when presented may remain on the screen for an extended period until action is taken by the user, while information is gathered, or until an application task has been completed.

The amount of time required for an operation to complete can range from a few microseconds to hours depending upon the complexity of the operation or the amount of data to be processed. For execution times in excess of a second, a well written application displays information about the current status of the operation. For example, in an operation such as saving a document, the information displayed may include the number of bytes written to disk. A greater amount of information would be displayed for an operation such as system backup. In this case the elapsed time; time left to completion; number of bytes, files and directories processed; and detailed summary information may be displayed. In these situations, the application user may desire to continue working in the application while the operation completes. However the application user is prohibited from working in the application until the operation completes since the application windows and information contained within those windows are concealed beneath the dialog box, unavailable to the user.

OBJECTS OF THE INVENTION

It is therefore an object of the present invention to provide a new and useful method for displaying status information during execution of time consuming application tasks within a computer system employing a windowed operating environment.

It is another object of the present invention to provide such a method which provides to an application user control over the amount of information and the format for the display of that information during execution of an application task.

It is yet another object of the present invention to provide a new and useful method for selecting a format for the display of status information during execution of an application task which utilizes the drop and drag features provided by windowed operating environments.

It is a further object of the present invention to provide a new and useful method for displaying status information during execution of time consuming application tasks within a computer system employing a windowed operating environment which provides an application user the ability to continue working in the application during task execution.

SUMMARY OF THE INVENTION

There is provided, in accordance with the present invention, a method for displaying status information during execution of an application task in a windowed application. The method provides two formats for displaying status information for an application task: (1) a detailed display format wherein status information is presented in a dialog box displayed over the application window, obscuring a portion of the application window, and which remains displayed until execution of the application task completes and obscuring a portion of said display screen; and (2) a concise display format wherein a brief summary of the status information is presented in a message displayed in a status bar along the bottom edge of the application window. The application user may select the format for display during task execution.

In the described embodiment, the detailed display format wherein status information is presented in a dialog box is presented as the default display format. The concise display format is selected by dragging the title bar for the dialog box into the status bar, the concise display format thereafter being displayed in substitution for the detailed display format. Dragging the message displayed in the status bar into the body of the application window returns the display format to the detailed, dialog box, display format.

The above and other objects, features, and advantages of the present invention will become apparent from the following description and the attached drawings.

which is presented to request information required to execute the Offline Send/Retrieve task.

Figure 1:
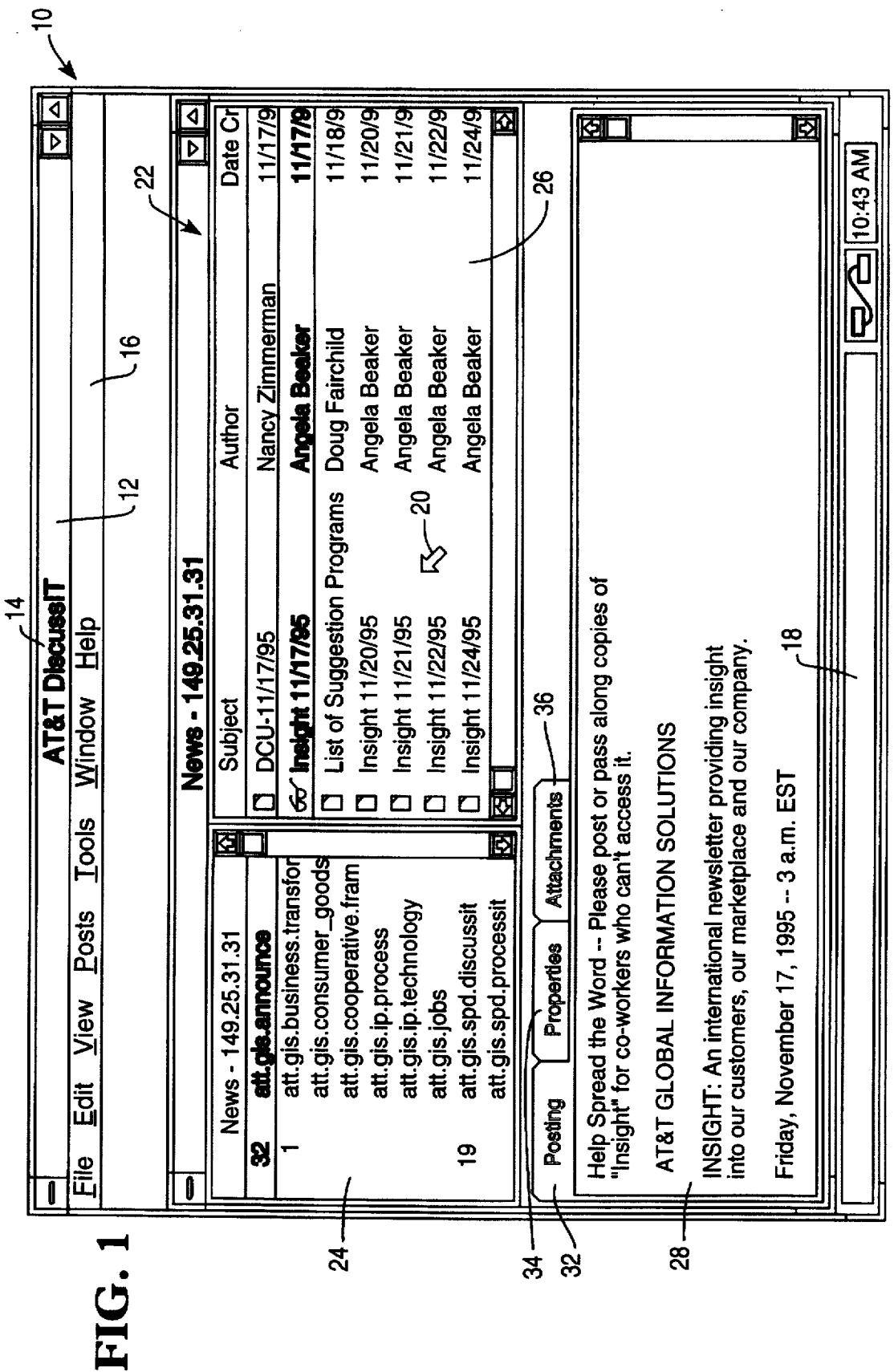
FIG. 1 illustrates an application window containing an application program titled "DiscussIT" running within the Windows operating environment.
Figure 4:
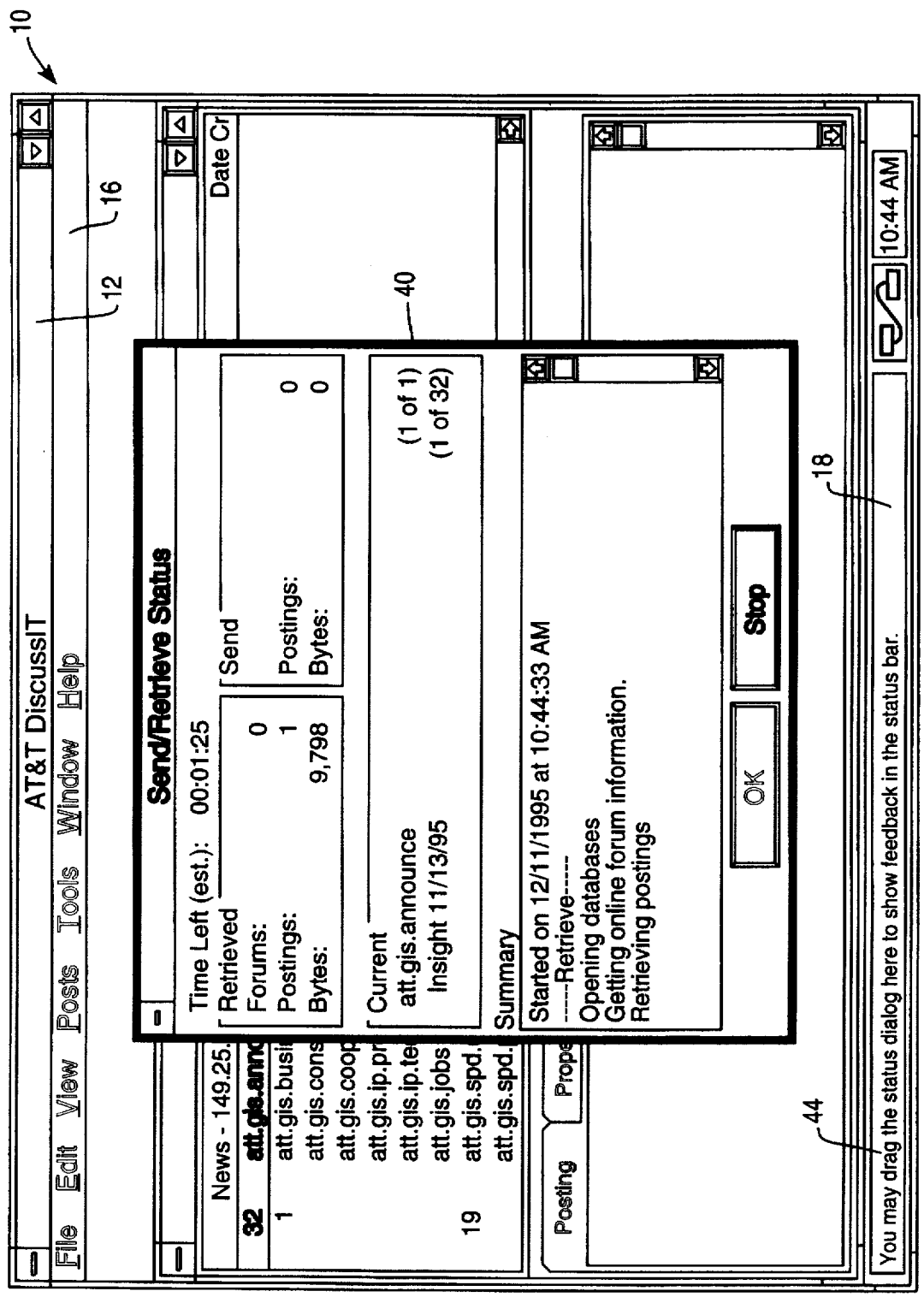

FIG. 4 is an illustration of the application window of FIG. 1, showing a dialog box titled "Send/Retrieve Status" which is displayed to provide task status information during execution of the Offline Send/Retrieve task.

Figure 5:
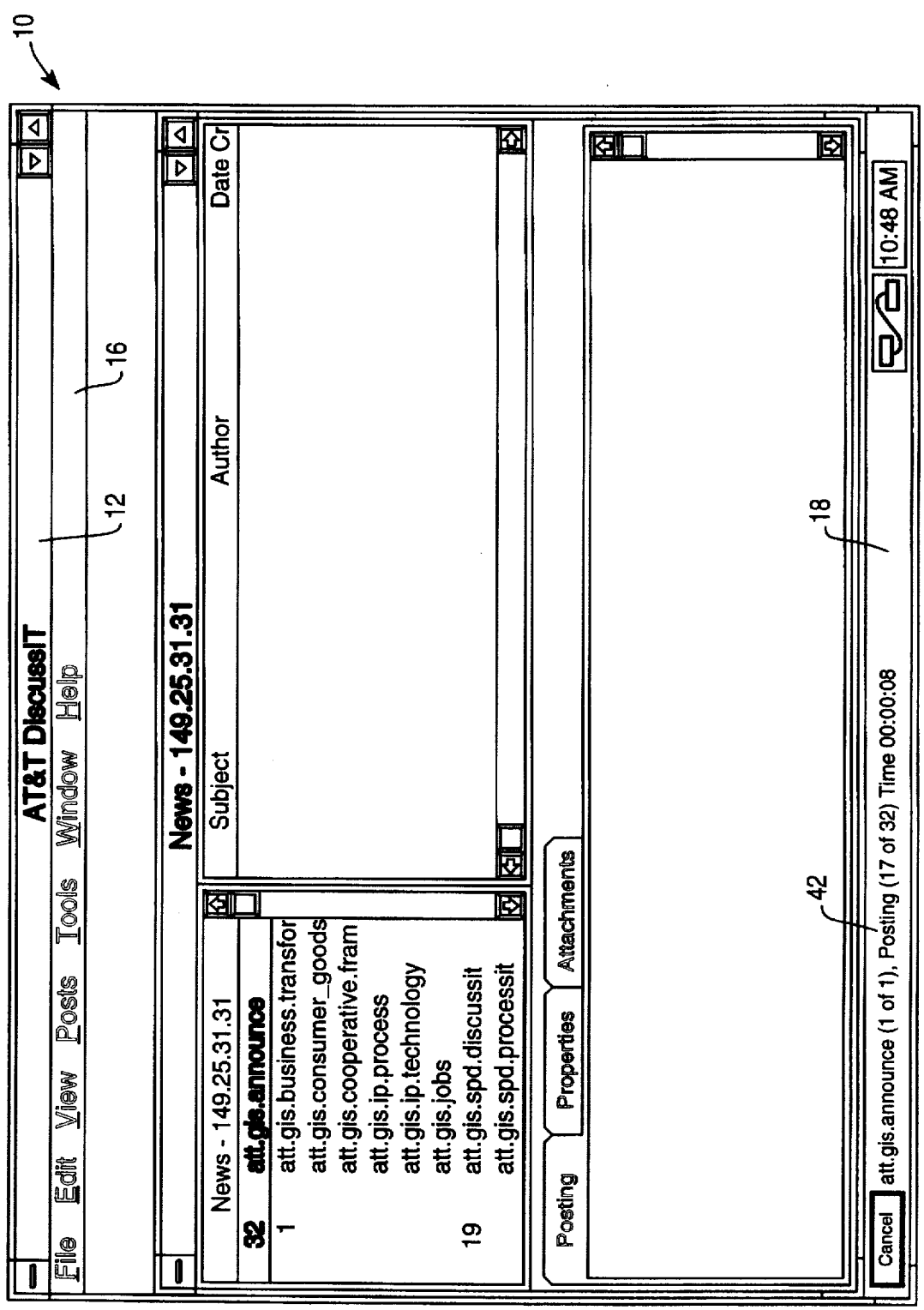

FIG. 5 is an illustration of the application window of FIG. 1, wherein Send/Retrieve Status information is displayed in a status bar at the bottom of the DiscussIT application window, rather than in a dialog box, in accordance with the present invention.

Figure 6:
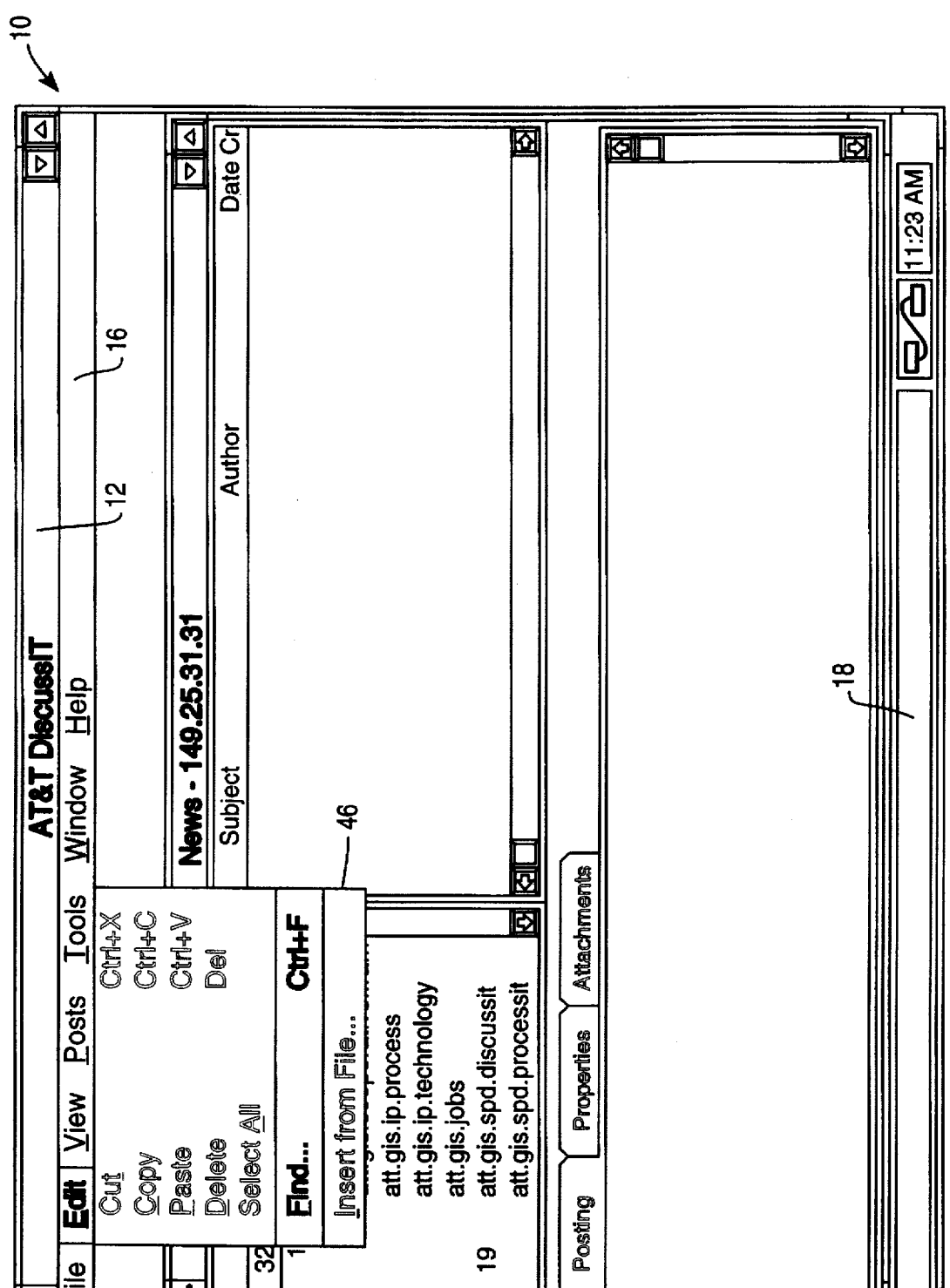

FIG. 6 is an illustration of the application window of FIG. 1, showing the selection of a task titled "Find . . ." from the DiscussIT application menu bar.

Figure 7:
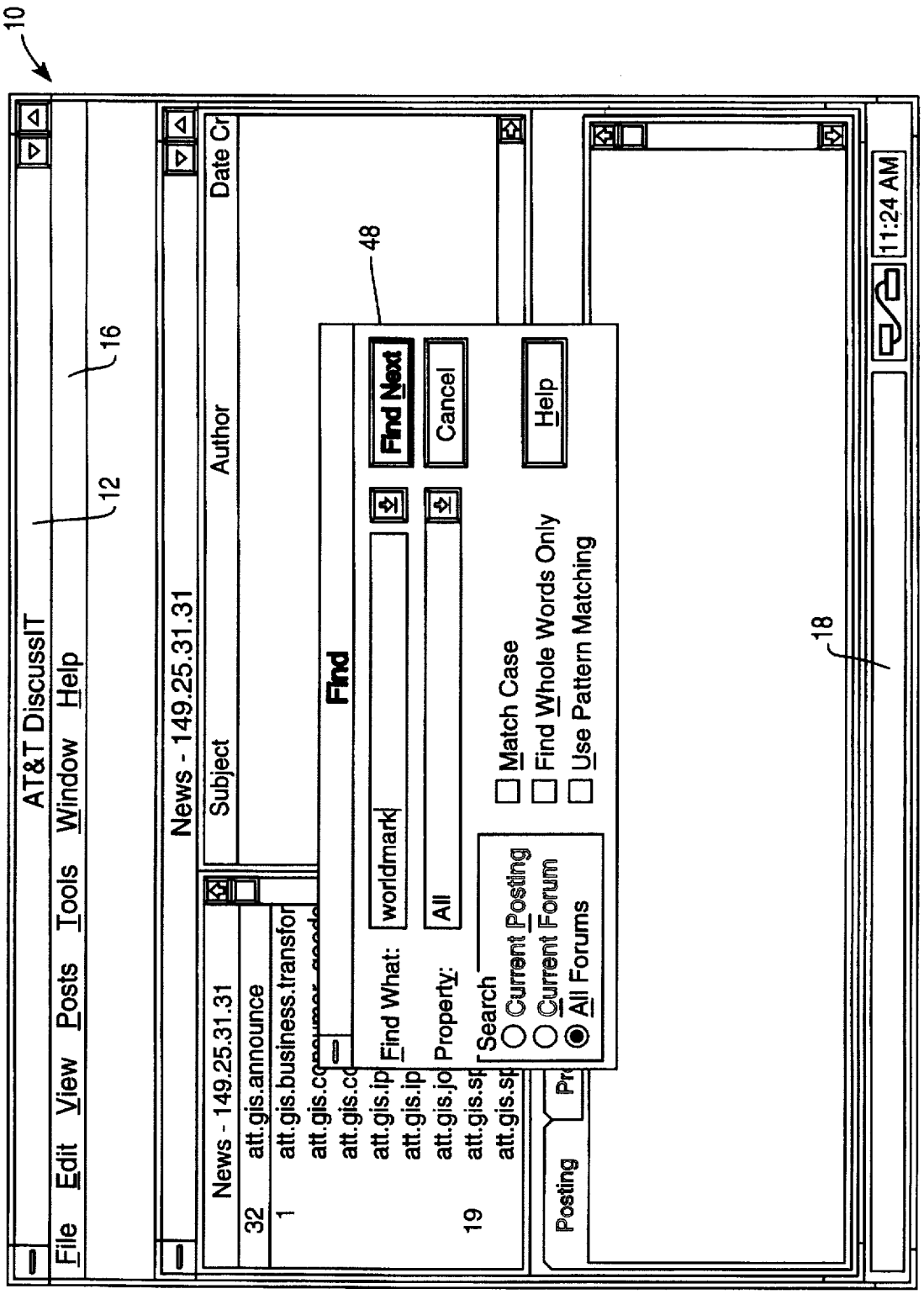

FIG. 7 is an illustration of the application window of FIG. 1, showing a dialog box titled "Find" which is presented to request information required to execute the Find task.

Figure 8:
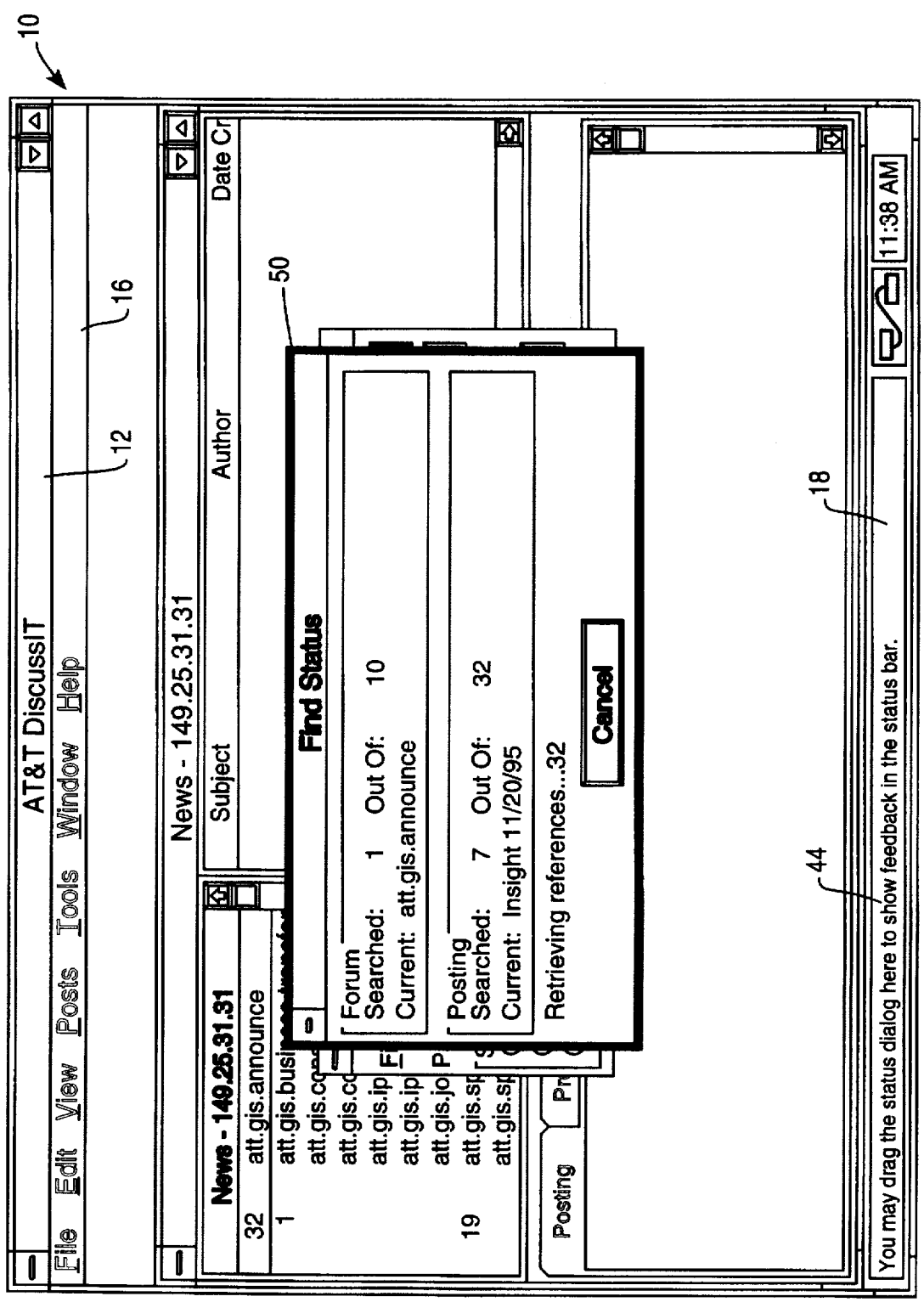

FIG. 8 is an illustration of the application window of FIG. 1, showing a dialog box titled "Find Status" which is displayed to provide task status information during execution of the Find task.

Figure 9:
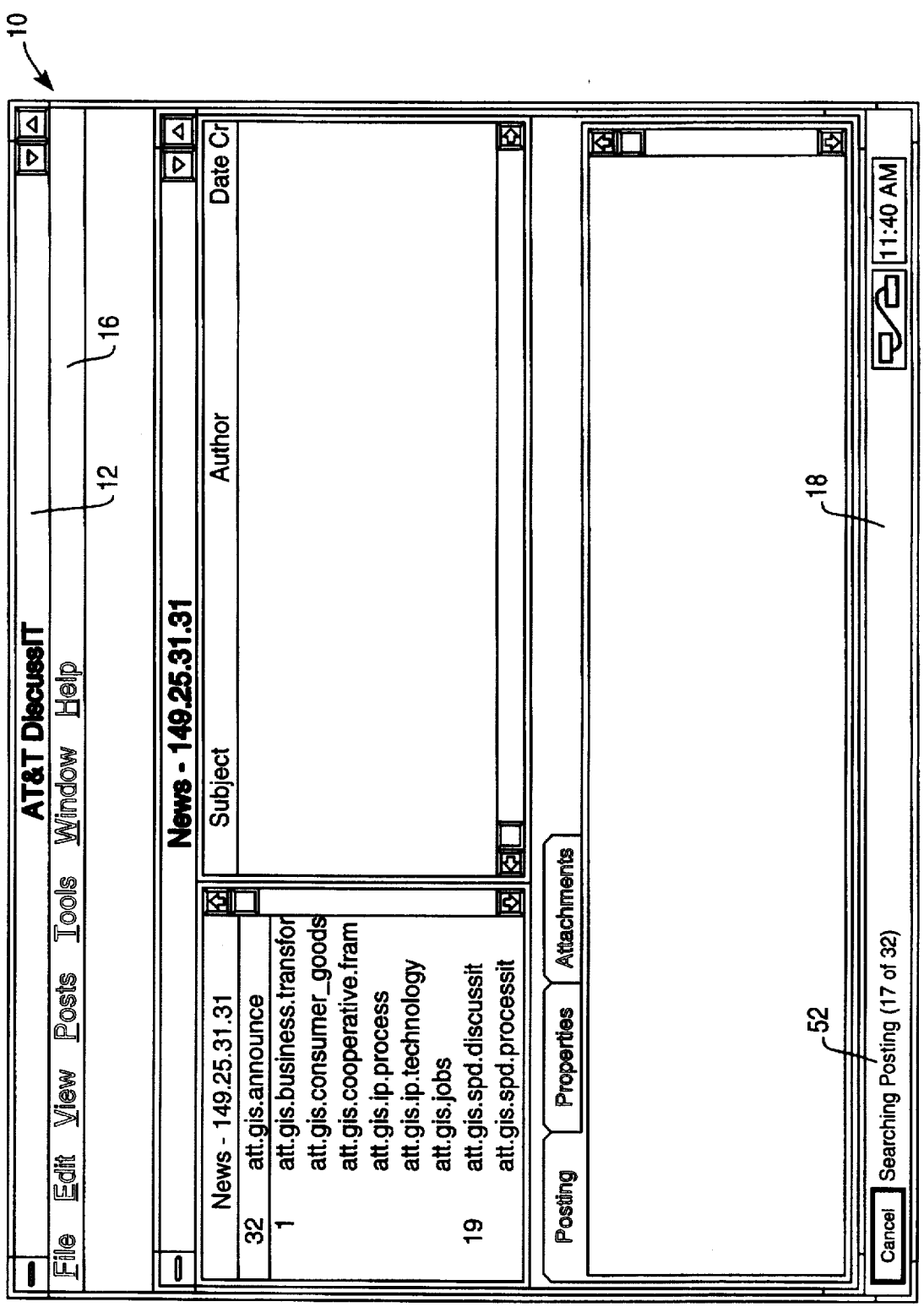

FIG. 9 is an illustration of the application window of FIG. 1, wherein Find Status information is displayed in the status bar at the bottom of the DiscussIT application window, rather than in a dialog box, in accordance with the present invention.

DETAILED DESCRIPTION OF THE PREFERRED EMBODIMENT

Referring now to FIG. 1, there is seen an application window 10 containing an application program titled "DiscussIT" running within the Windows operating environment. The application window includes a title bar 12 provided along the top edge of the application window in which the title 14 of the application is displayed. Dialog boxes, document boxes, and other windows displayed within the application window will also each normally contain a title bar and title.

A menu bar 16 is displayed below the application title bar, listing the available pull-down menus. Each pull-down menu contains a list of commands or tasks which can be selected for execution within the application. Along the bottom edge of the application window a status bar 18 is provided. The status bar supplies information about the application or application commands.

Windows, menus, commands and tasks contained on a selected menu, as well as other window elements are selected or executed either through the computer keyboard or through positioning of a mouse pointer 20.

The window elements and features discussed above, and additional window elements and features not discussed above, are common to most Windows applications and well known by Windows application users.

The DiscussIT application is a tool for group threaded discussion. "Discussion" takes place by creating postings and replying to postings made by other users. The basic components of DiscussIT include: databases, forums, topics, and postings. DiscussIT allows a user to create databases and to create forums within the database. A forum is a broad topic for discussion and consists of a collection of postings related to the forum's subject. A DiscussIT database consists of a collection of forums and its topics and postings. A thread refers to a collection of postings that are replies to a specific posting.

Included within the DiscussIT application window is a database viewer 22. The particular database shown in the database viewer of FIG. 1 is titled "News—149.25.31.31". The database viewer allows a user to view the forums, topics, and postings of a database. Database viewers can be defined for different types of databases, and multiple database viewers can be defined for the same database. For example, a user can define a database viewer for Usenet news to read articles about recreation groups and then define another database viewer for Usenet news to read articles about Microsoft Windows. All database viewers have a similar structure. The database viewer shown consists of three panes: a forum pane 24, a header pane 26, and a posting pane 28.

The forum pane 24 contains a listing of forum names. The number in front of the forum name represents the number of unread postings. Forums names may be arranged in a hierarchy with sub-forums indented to the right from the forums in which they were created. Typically, a subforum has a more specific topic of discussion than the forum to which it belongs. The forum pane title bar displays the name of the database, as well as the path to the currently opened forum. A forum may be opened by simply placing the mouse pointer over the forum name and double-clicking the mouse.

The header pane 26 includes a listing of postings for a selected forum. Identifying information for each posting is provided in columns titled subject, author, and date. Like forums, postings can also be arranged in a hierarchy, indicated by the indentation of the posting subject. A posting at the top of the hierarchy is called a topic. A posting that is indented under another posting is called a reply. The collection of a topic and all replies to the topic is called a thread. To read a posting, the application user simply double-clicks on the appropriate line in the header pane.

The posting pane 28 has three components: the posting text or body 32, the properties 34, and the attachments 36. These three components are indicated by the three folder tabs labeled Posting, Properties, and Attachments, respectively. The currently selected component is indicated by a bold face folder tab label. To display other components of the posting, simply single-click on the corresponding posting tab.

The Figures provide examples of the execution of two tasks within the DiscussIT application which provide status dialog boxes that may remain on the screen for an extended period while task execution completes. During this time the windows and information contained within those windows are concealed beneath the dialog boxes, unavailable to the user. The two tasks shown, (1) sending and retrieving posting to and from offline storage and (2) finding a posting having particular attributes, are discussed below.

Sending and Retrieving Postings to and from Offline Storage

DiscussIT allows a user to retrieve forums and place them in off-line storage. This feature is especially useful when a user must connect to a database using a modem and wants to minimize the length of the call, or if the user is working with a laptop computer.

Figure 2:
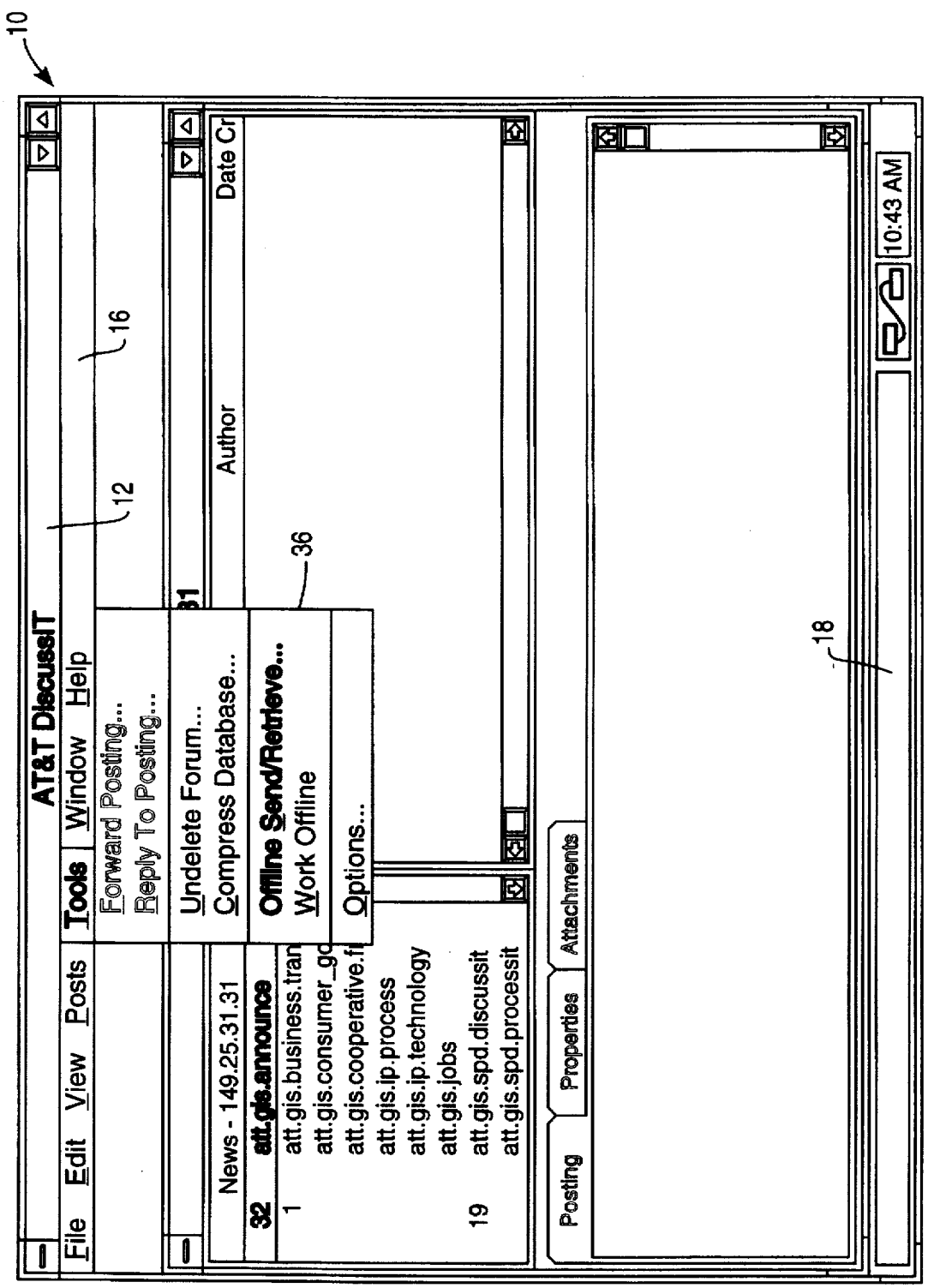
FIG. 2 is an illustration of the application window of FIG. 1, showing the selection of a task titled "Offline Send/Retrieve . . ." from the DiscussIT application menu bar.
Figure 3:
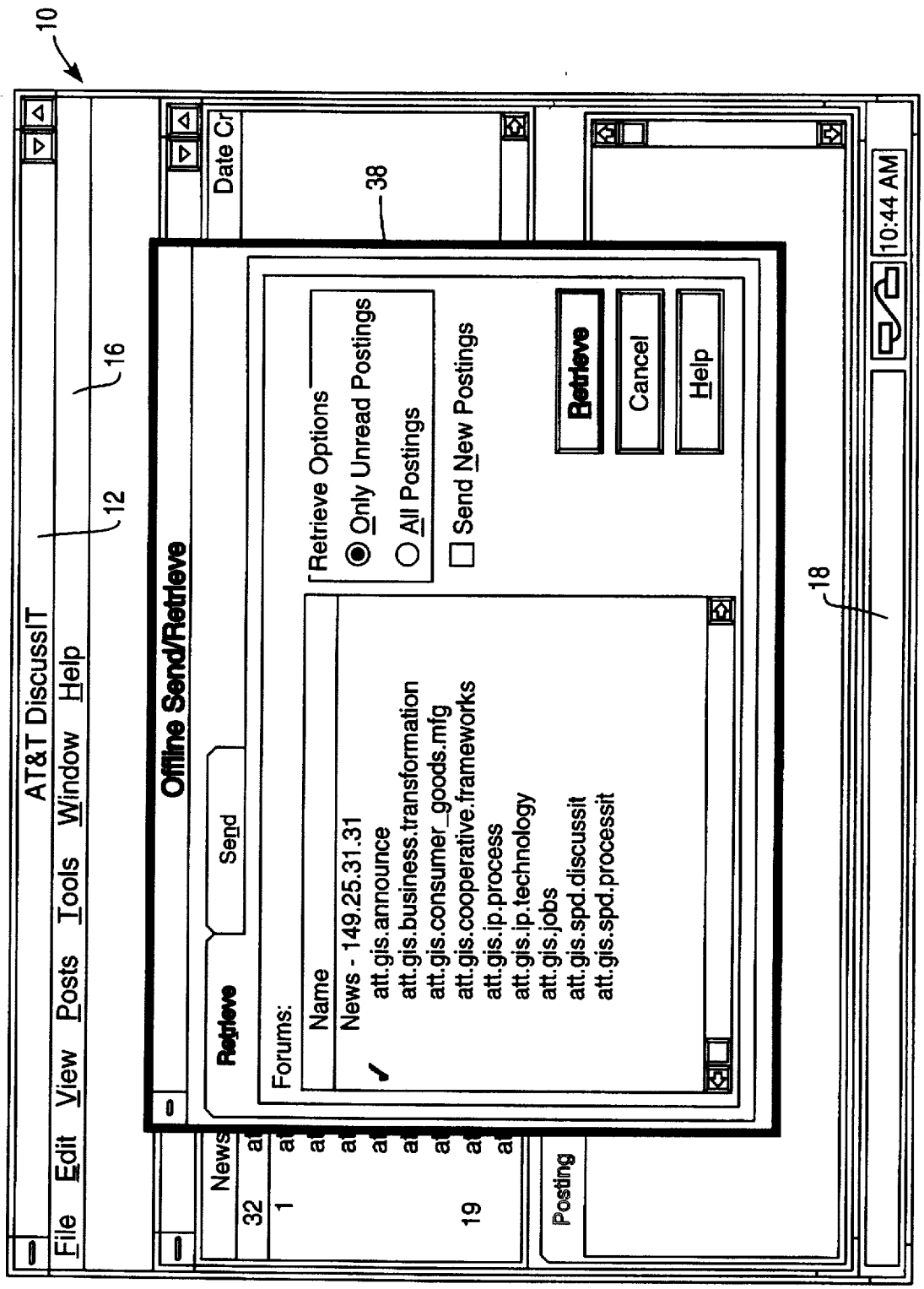
FIG. 3 is an illustration of the application window of FIG. 1, showing a dialog box titled "Offline Send/Retrieve"

The process for retrieving forums from a database, illustrated in FIGS. 2 through 4, is as follows:

1. Select the Tools menu from the menu bar. The tools menu is identified by reference numeral 36 in FIG. 2.
2. Choose "Offline Send/Retrieve . . ." from the Tools menu. A dialog box titled "Offline Send/Retrieve" is displayed. The Send/Retrieve dialog box is identified by reference numeral 38 in FIG. 3. By default, the Retrieve tab will be on top.

3. Select the forums to retrieve to off-line storage.
4. Select the desired retrieve option: retrieve only unread postings or all postings.
5. Check the Send New Postings option if new postings created off-line are to be sent during the next retrieve. All new postings created off-line will be placed in a forum named Unsent Postings.
6. Click the Retrieve button. Information about the retrieve is displayed in the Send/Retrieve Status dialog box 40, shown in FIG. 4.

A similar series of steps is executed to send postings and attachments to online storage.

As stated above, information about the send or retrieve operation is displayed in the Send/Retrieve Status dialog box 40 while the task executes. FIG. 4 provides an illustration of the Send/Retrieve Status dialog box 40 including status information typically provided during a retrieve operation.

The present invention is a mechanism that allows an end-user of an application, such as DiscussIT, to control the amount of information and the format for the display of that information during execution of time consuming application tasks and operations. In these situations, the application user may desire to continue working in the application while the operation completes. Instead of a large portion of the display screen being consumed with detailed operational status information presented in a dialog box, such as the Send/Retrieve Status dialog box 40 shown in FIG. 4, a brief summary of task status, displayed unobtrusively, may be desired by the user.

In accordance with the present invention a mechanism for displaying application status information in alternate formats is provided. An application including the present invention is written to include a concise summary information display format in addition to the detailed summary normally presented to the application user in a dialog box. FIG. 5 provides an example of a concise summary information display format for the DiscussIT Send/Retrieve task: a brief status message 42 containing the information of most interest to the application user is displayed in the status bar 18.

The concise display format is selected by "dragging" the title bar of the Send/Retrieve Status dialog box 40 to the status bar 18. Dragging is accomplished by placing the mouse pointer into the title bar, pressing and holding the left mouse button, and moving the box with the mouse. As the dialog box is moved, an outline of the box moves with it. Once placed into the status bar the left mouse button is released. Thereafter the concise display format will be shown during execution of the Send/Retrieve task.

A brief message, identified by reference numeral 44, indicating the manner in which the concise display format is selected is shown in the status bar 18 during display of the Send/Retrieve Status dialog box 40, as seen in FIG. 4.

Should the application user desire to return to the detailed display format provided by dialog box 40, the status message 42 can be selected with the mouse and dragged back up into the main application display area. Once dropped into the main application display area, the status information will be expanded back into the original dialog box display format.

Finding a Posting

The DiscussIT Find task provides another example of the mechanism for displaying application status information in alternate formats; either a detailed display format, e.g., the Find Status dialog box, or in a concise display format, e.g., a message displayed in status bar 18.

The Find task allows a user to find a posting having particular attributes. The process for finding a posting, illustrated in FIGS. 6 through 8, consists of the following steps:

1. Select the Edit menu from the menu bar. The edit menu is identified by reference numeral 46 in FIG. 6.
2. Choose "Find . . ." from the Edit menu. Invoking this command displays the Find dialog box 48 within which the application user enters information to define the search criteria. The Find dialog box contains a text box for the entry of a search string, a combo box that specifies the type of item to be searched, a list box wherein the range of postings to be searched can be identified, and mechanisms for specifying other search criteria.
3. Enter the desired search criteria.
4. Click the Find Next button. Information concerning the search progress is displayed in the Find Status dialog box 50, illustrated in FIG. 8.

As with the Send/Retrieve Status dialog box discussed above, the detailed status presentation format provided by the Find dialog box can also be transformed into a concise display format by dragging the title bar of the Find dialog box 50 to the status bar 18. A brief find status message 52 will thereafter be shown in the status bar 18 instead of the Find dialog box 50.

It can thus be seen that there has been provided by the present invention a new and useful method for displaying status information during execution of time consuming application tasks within a computer system employing a windowed operating environment. The described method provides to an application user control over the amount of information and the format for the display of that information during execution of an application task and provides to the user the ability to continue working in the application during task execution.

The discussion presented above provides two examples of application tasks within the DiscussIT application wherein the present invention has been implemented. It should be recognized that the invention is not limited to use within the DiscussIT application, or for displaying application task status. The described invention can be implemented within any application wherein information is presented on the computer display screen such that the display screen is obscured while information is gathered, or until an application task has been completed.

Although the presently preferred embodiment of the invention has been described, it will be understood that various changes may be made within the scope of the appended claims.

What is claimed is:

1. A method for displaying status information during execution of an application task in a windowed application, said windowed application being displayed on a screen within a window containing a status bar along the bottom edge of said window, said windowed application providing a detailed display format for displaying information related to said application task, said detailed display format comprising a status dialog box including a title bar which are displayed over said application window, said status dialog box being presented on said display screen and remaining on said screen during execution of said application task and obscuring a portion of said display screen, said method comprising the steps of:

defining a concise display format for displaying status information related to said application task, said concise display format containing a brief summary of the status information contained in said detailed display format, said concise display format comprising a message for display within said status bar; and selecting said concise display format for display in substitution for said detailed display format by dragging the title bar of said dialog box into said status bar.

2. The method in accordance with claim 1, further comprising the step of:

dragging said message displayed in said status bar into the body of said application window, whereby the display format is returned to said detailed display format.

3. A method for displaying status information during execution of an application task in a windowed application presented on a display screen, said windowed application being displayed on said screen within a window containing a status bar along the bottom edge of said window, said method comprising the steps of:

defining a detailed display format for displaying information related to an application task, said detailed display format comprising a status dialog box including a title bar displayed over said application window and remaining on said screen during execution of said application task;

defining a concise display format for displaying information related to said application task, said concise display format comprising a brief status summary message for display within said status bar; and displaying said detailed display format during execution of said application task as a default display format; and dragging the title bar of said dialog box into said status bar to select said concise display format for display in substitution for said detailed display format.

4. The method in accordance with claim 3, further comprising the step of:

dragging said message displayed in said status bar into the body of said application window, whereby the display format is returned to said detailed display format.

* * * * *